United States Patent [19]
DeJulio

[11] 3,837,109
[45] Sept. 24, 1974

[54] FISHING ROD HOLDER

[76] Inventor: Robert DeJulio, 4444 Clay St., Denver, Colo. 80211

[22] Filed: May 29, 1973

[21] Appl. No.: 364,458

[52] U.S. Cl. .................................................. 43/15
[51] Int. Cl. ........................................... A01k 97/00
[58] Field of Search ........... 43/15, 16, 21.2; 248/38, 248/41, 42, 45

[56] References Cited
UNITED STATES PATENTS

| | | | |
|---|---|---|---|
| 2,803,912 | 8/1957 | Kellar | 43/16 |
| 2,804,277 | 8/1957 | Kinder | 43/21.2 X |
| 2,810,981 | 10/1957 | Littau | 43/16 |
| 2,944,361 | 7/1960 | Coulter | 43/16 |
| 3,170,262 | 2/1965 | Hall | 43/15 |
| 3,532,309 | 10/1970 | Reddick | 248/42 |
| 3,562,947 | 2/1971 | Martin | 43/15 |
| 3,699,701 | 10/1972 | Jacobs | 43/21.2 X |

FOREIGN PATENTS OR APPLICATIONS 514,549  2/1955  Italy ........................................ 43/15

*Primary Examiner*—Warner H. Camp
*Attorney, Agent, or Firm*—C. B. Messenger

[57] ABSTRACT

A fishing rod holder providing a tube for the reception of a fish rod handle on a pivot mount whereby the tube and rod may be moved rotationally from an "at rest" position to an elevated line retrieving position. The holder has a support stand inclusive of an angled section disposed for foot contact to facilitate engagement of the holder in a ground surface. A fish line engages and can move a release latch which has a plurality of tension adjusting engaged positions whereby the latch can be set for the heavier and lighter release forces that might be exerted on the line by various sized fish.

4 Claims, 6 Drawing Figures

PATENTED SEP 24 1974

FISHING ROD HOLDER

BACKGROUND OF THE INVENTION

Various types of fish pole holders have previously been provided that include mechanisms for signaling the presence of fish or even for moving the pole or line in response to a nibbling fish so that a fish hook could be engaged. In general, such prior mechanisms have been overly complicated and are hard to manufacture and assemble and, accordingly, are generally quite expensive.

SUMMARY OF THE INVENTION

In order to provide an efficient and economical unit, fish rod holders are here presented that are of simplified construction utilizing a commonality of parts. A support stand having an angle section is joined to a lower hinge plate that is of construction identical with an upper hinge plate that is pivotally mounted to the lower plate and support stand. The lower plate and angle section of the stand provide a convenient foot rest that may be used when the stand is to be engaged in a ground surface. A spring element is used to move the upper hinge plate and a rod holding tube to an elevated fish catching position when a release latch engaged by the fish line has been tripped. The release latch provides a cam formed section for engagement with a catch rod and the curvature of such section is changed at forward and rearwardly disposed segments to provide changed release characteristics. With this arrangement the present fish rod holder can be preset for the catching of various sizes and species of fish.

DESCRIPTION OF THE PREFERRED EMBODIMENTS

Figure 1:
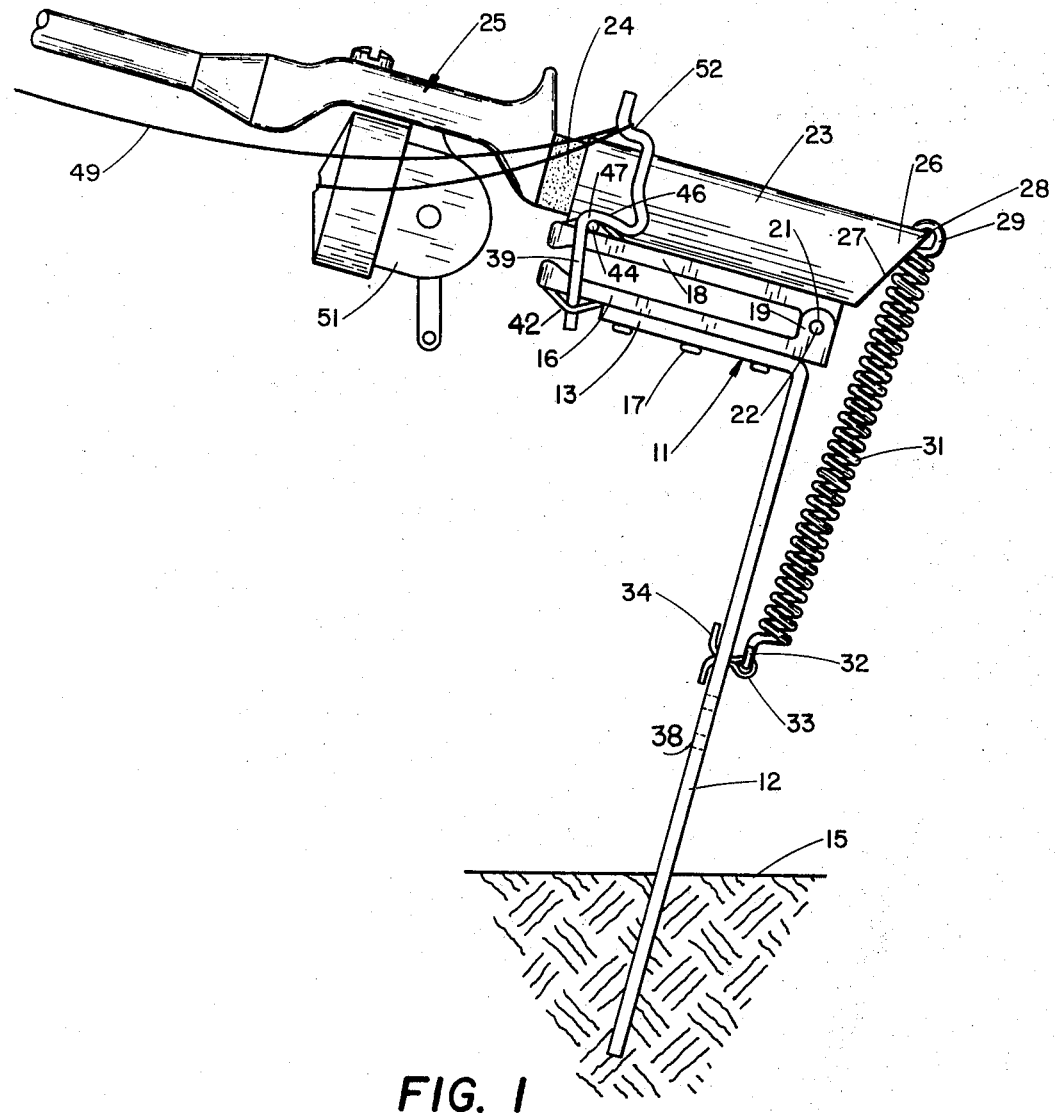
FIG. 1 is a side elevation illustrating an embodiment of the invention in a first locking position.
Figure 2:
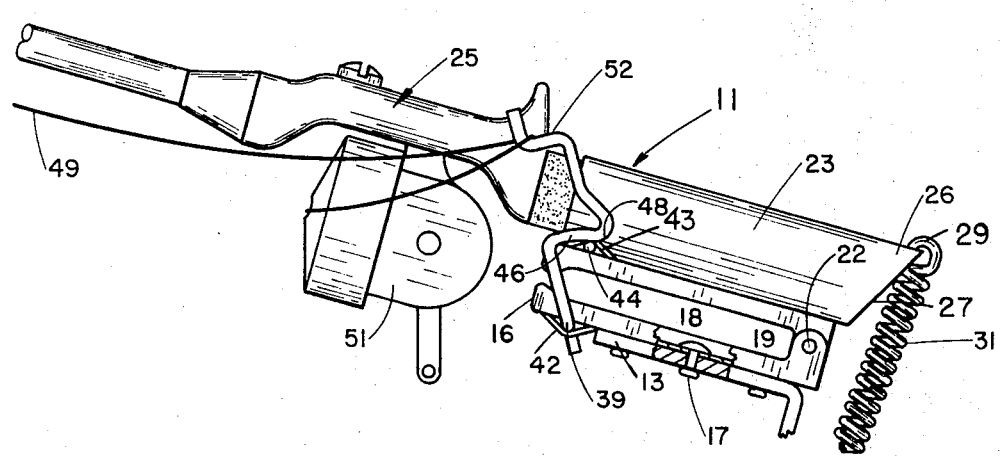
FIG. 2 is an elevation similar to that of FIG. 1 showing the latch mechanism in an alternate locking position.
Figures 3, 4:
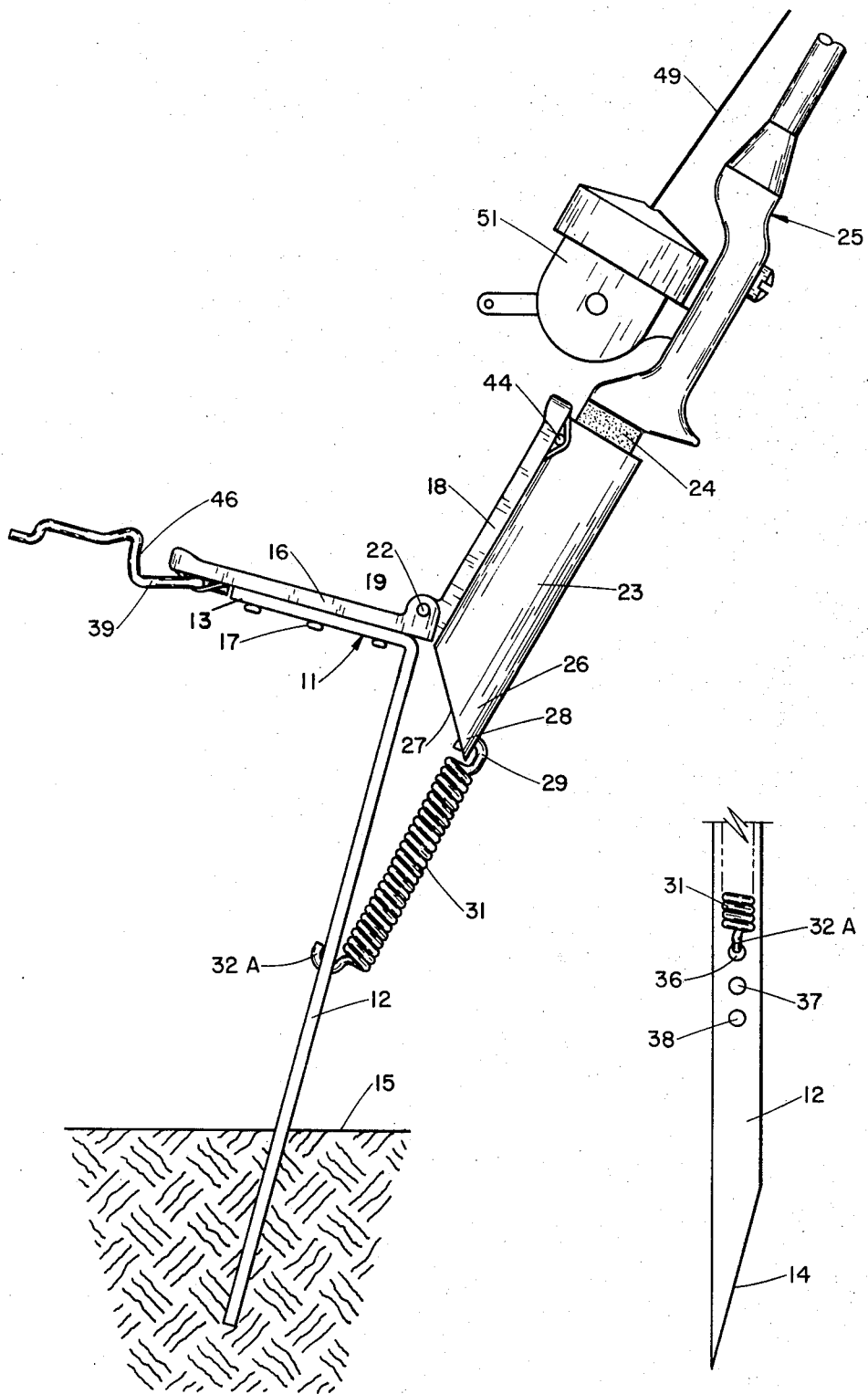
FIG. 3 is a side elevation showing the device in an alternate fish catching position.
FIG. 4 is a partial front elevation showing the support stake.
Figure 5:
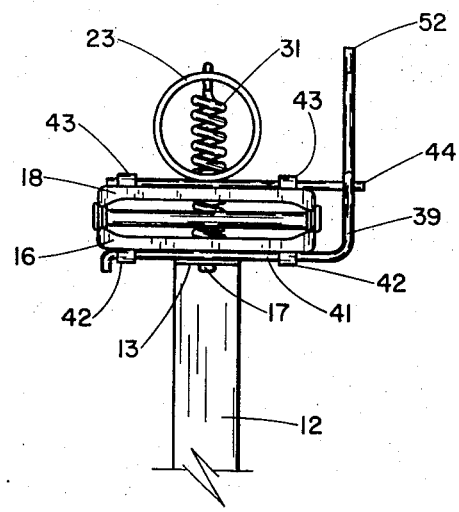
FIG. 5 is a front elevation showing additional features of the latch mechanism.

For the preferred embodiment shown in FIGS. 1-5, the fish pole holder 11 has a ground engaging leg 12 and an angled section 13. The terminal end of the leg 12 has a sharpened tapered section 14 as shown in FIG. 4, so that the leg can be engaged in a supporting ground structure 15 to be held securely therein. A lower hinge plate 16 is secured to the angled section 13 as by rivets 17 or other fastener elements. A top hinge plate 18 of construction identical with the lower plate 16 has ears similar to the ears 19 shown for the lower plate 16. These inwardly bent ears 19 have through openings 21 so that hinge pin 22 may be passed therethrough. A short section of tube 23 of length adapted to receive the handle 24 of a fishing pole 25 is secured to the upper hinge plate 18 by use of through rivets or other fasteners (not shown). The rearwardly disposed end 26 for the tube 23 is cut diagonally along the line 27 so that the forward upper section 28 extends rearwardly in a position to be engaged by the loop 29 of a spring 31. The opposite end of the spring has a bent loop 32 that is in FIG. 1 engaged to a cotter pin type of structure 33 that passes through one of a plurality of holes in the leg 12 and is held therein by the bent forked ends 34 of the cotter pin 33. Where a plurality of spring receiving holes 36, 37 and 38 are provided as shown in FIG. 4, the cotter pin can be disposed at various elevations along the leg 12 to thereby effectively change the spring force that will be exerted by the spring 31. With the structure described the tension in the spring 31 will tend to move the fish pole holder 11 to the alternate tripped or fish catching position illustrated in FIG. 2.

In order to hold the mechanism in the position illustrated in FIGS. 1 and 2, a pivotally mounted latch 39 is provided that has a pivot section 41 extending through the punched down straps 42 that are formed out of the same metal providing the lower hinge plate 16. Since the lower hinge plate 16 and the upper hinge plate are identical, similar punched strap sections 43 are provided on the upper hinge plate 18. A catch rod 44 extends through the upper straps 43 in position to be engaged by the cam section 46 of the latch 39. Cam section 46 of latch 39 is cooperatively formed with respect to the axis of pivot section 41 so a forward segment 47, as shown engaged in FIG. 1, is of greater curvature with respect to the arc of movement about the pivot axis 41 than the curvature provided for the rearward segment 48 which is shown engaged to the catch rod 44 in FIG. 2. With this arrangement the release pressure to be exerted by the fishing line 49 is substantially less when the latch 39 is in the position shown in FIG. 2 than the release pressure that is required for release of the latch 39 when the catch is engaged as illustrated in FIG. 1. If the device is preset as shown in FIG. 2, a very slight tug on the fish line, such as might be exerted by the nibbling of a small fish, will cause release of the latch, whereas the tugging of a large fish might be required if the latch is set as illustrated in FIG. 1. For either installation the fish line will be extended from the reel 51 to a hook section 52 on the latch 39 and then outwardly along the eyelets and guides provided by the pole 25.

FIGS. 3 and 4 show an alternate means for attaching a spring 31 to the upright standard 12. In these FIGS. it will be noted that the lower loop 32A of the spring 31 is itself extended directly through one of the selected holes 36, 37, 38. All other construction features are identical to those previously shown and described. FIG. 3 does help to further illustrate, however, the beneficial result obtained through use of the angled cut 27 for the rear end of the tube 23. This particular arrangement avoids any interference between the spring 31 and the tube 23 when the spring is either in its retracted or extended configuration.

Figure 6:
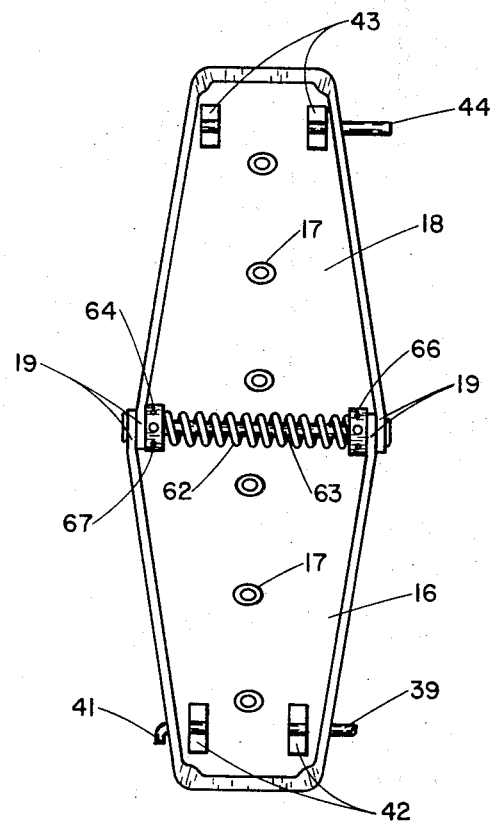
FIG. 6 is a front elevation showing an alternate spring drive with the support components in the open or fish catching position.

For the alternate embodiment shown in FIG. 6, a torsion type spring 62 is used. Here the torsion spring 62 is extended about the pivot pin 63 and through all of the ears 19 provided by the upper and lower plates 16 and 18, respectively.

Torsion adjustment bushings 64 and 66 engage the opposite ends of the torsion spring 63. These bushings 64 and 66 can be selectively anchored with respect to the hinge plates 16 and 18 through use of a pin (not shown) engaged in the adjusting holes 67. When such pin is released and the bushing is rotated, the preload force exerted on the spring can be changed. This adjustment of spring force can again accommodate the present fish rod holder for use under varied fishing conditions.

For all embodiments of the invention it should be noted that the angle section 13 for the stand 12 and the lower hinge plate 16 secured thereto together provide a convenient flat surface adapted for engagement by the fisherman's foot when the holder 11 is to be placed and secured in a supporting ground 15. For most all soils the foot pressure that can be applied will be adequate to assure a proper and secure installation of the holder which will prevent loss or damage to the unit.

I claim:

1. A fishing rod holder for automatically moving a fish rod supported by said holder in response to movements of a fish line on said rod comprising a stand bent intermediate its ends providing a ground engaging leg and an angled support section, a lower hinge plate that is of a generally flat section having upwardly turned ears adjacent the bend of said stand mounted on the angled section of said stand, an upper hinge plate of construction similar to said lower hinge plate having downwardly turned ears, all of said ears cooperatively providing aligned openings therethrough, a hinge pin interconnecting the openings of said ears and providing a pivot mount for said upper hinge plate, a rod receiving component on said upper hinge plate adapted to receive and hold a fishing rod, aligned receptacles disposed on the forward ends of each of said upper and lower hinge plates, a latch element pivotally received in the receptacles of a first of said hinge plates, a catch element received in the receptacles of the second of said hinge plates, resilient spring means on said holder and operatively connected to elements thereof for urging said upper hinge plate away from a closed position adjacent said lower hinge plate, said latch and catch elements being operative to hold said upper hinge plate in the closed position adjacent said lower hinge plate when engaged, hook means on said latch element to receive said fish line whereby the tensioning of said line operates to release said catch, and said latch element having alternate catch engaging positions that are of varied slope with respect to the pivot of the latch element whereby the fish line tension required to release said catch is varied when alternate engaging positions are used.

2. The rod holder of claim 1 wherein said spring means is operatively connected to a rearward extension of said rod receiving component and the ground leg of said stand, and further comprising means for adjusting the tension of said spring.

3. The rod holder of claim 1 wherein said spring means is provided by a torsion spring disposed about the hinge pin for said hinge plates, and further comprising torsion adjusting means whereby the force exerted by said spring may be changed.

4. The rod holder of claim 1 wherein said hinge plates are inclusive of sidewalls turned inwardly together with said ears and wherein said aligned receptacles are punched from the material of said plates and extend outwardly with respect to the disposition of said ears.

* * * * *